United States Patent

Van Der Pol

[11] Patent Number: 5,365,178
[45] Date of Patent: Nov. 15, 1994

[54] ELECTRICAL DEVICE FOR LIQUID LEVEL MEASUREMENTS IN INDUSTRIAL TANKS AND THE LIKE

[75] Inventor: Ronald Van Der Pol, Venlo, Netherlands

[73] Assignee: Krohne Messtechnik GmbH & Co. KG, Duisburg, Germany

[21] Appl. No.: 938,122
[22] PCT Filed: Jan. 21, 1992
[86] PCT No.: PCT/EP92/00131
   § 371 Date: Oct. 8, 1992
   § 102(e) Date: Oct. 8, 1992
[87] PCT Pub. No.: WO92/14124
   PCT Pub. Date: Aug. 20, 1992

[30] Foreign Application Priority Data

Feb. 12, 1991 [DE] Germany ............... 4104146

[51] Int. Cl.$^5$ .................. G01R 27/04; G01S 13/08
[52] U.S. Cl. ................................ 324/644; 342/124
[58] Field of Search .......... 324/636, 637, 644, 642; 342/124; 364/561

[56] References Cited

U.S. PATENT DOCUMENTS

| | | | |
|---|---|---|---|
| 3,307,182 | 2/1967 | Morrow. | |
| 3,688,188 | 8/1972 | Bak et al. | 324/636 |
| 4,030,015 | 9/1977 | Zollner | 324/636 |
| 4,210,023 | 7/1980 | Sakamoto et al. | 342/124 |
| 4,268,828 | 5/1981 | Gribbs. | |
| 4,425,793 | 1/1984 | Turton et al. | 342/124 |
| 4,435,709 | 3/1984 | Kipp | 342/124 |
| 4,489,601 | 12/1984 | Rao et al. | 324/642 |
| 4,495,807 | 1/1985 | Field et al. | 324/642 |
| 4,665,403 | 5/1987 | Edvardsson | 342/124 |
| 4,744,040 | 5/1988 | Kawata et al. | 342/124 |
| 4,847,623 | 7/1989 | Jean et al. | 342/124 |
| 5,083,089 | 1/1992 | Yukl | 324/636 |

FOREIGN PATENT DOCUMENTS

| | | |
|---|---|---|
| 0054335 | 6/1982 | European Pat. Off. . |
| 3121781A1 | 3/1982 | Germany . |
| 3134243 | 7/1982 | Germany . |

*Primary Examiner*—Maura K. Regan
*Attorney, Agent, or Firm*—Townsend and Townsend Khourie and Crew

[57] ABSTRACT

An electrical device for measuring the liquid level in industrial tanks and the like with a microwave transmitter and receiver and a waveguide provided with an aperture and an antenna. The signal reflected from the liquid surface and the transmitted signal are fed to a frequency conversion stage (8), whose low-frequency output signal is sent via an A/D converter (12) to a microprocessor calculating the fill level. To reduce the effect of interference frequencies produced by reflection of microwaves in the optical aperture, etc., a band-pass filter (9,10) with a lower limiting frequency selected to attenuate the low-frequency interference frequencies is placed between the frequency conversion stage (8) and the A/D converter (12). The lower limiting frequency can either be controlled with microprocessor (13) or the band-pass filter (9, 10) has adjustable limiting frequencies. To inhibit overcontrol of the A/D converter, an amplification stage (11) controlled by microprocessor (13) is provided for band-pass filter (9, 10).

14 Claims, 2 Drawing Sheets

ELECTRICAL DEVICE FOR LIQUID LEVEL MEASUREMENTS IN INDUSTRIAL TANKS AND THE LIKE

BACKGROUND OF THE INVENTION

The invention concerns an electrical circuit for a device for measuring fluid levels in industrial tanks and the like. It has an electronic transmitter and receiver for microwaves and a cavity resonator equipped with an aperture and antenna in which the signal reflected from the liquid surface and the emitted signal are fed to a frequency conversion stage. Its low-frequency output signal is fed via an analog-to-digital converter to a microprocessor that calculates the fill level.

Level measurement devices utilizing microwaves are known. They transmit signals in the microwave range which are reflected on the surface of the medium in the tank and received by a receiver. The distance between the level measurement device and the surface of the medium is determined from the signals by means of an electronic circuit which includes microprocessors and electronic computers. When such microwave level measurement devices are used with tanks, like industrial tanks, subject to an underpressure or overpressure at high or low operating temperatures, especially when they contain explosive and/or corrosive and/or toxic media, it is necessary to separate the tank interior from the electronic transmitting and receiving part. For this purpose a cylindrical cavity resonator aperture made of quartz glass or the like is arranged in the waveguide or cavity resonator protruding through the top of the tank, this aperture advantageously having a low dielectric loss factor for microwave transmissions. In level measurement devices of this type a transmitted signal that continuously varies in frequency is generated by a voltage-controlled oscillator and directed toward the liquid surface via the waveguide provided with an aperture and antenna. The electromagnetic waves reflected by the liquid surface are received by the antenna and converted by the main part into an electrical frequency signal that is fed to a frequency converter. Owing to the level-dependent travel time of the microwaves in the tank the incoming signal undergoes a frequency shift relative to the emitted signal that is directly proportional to the level.

A frequency conversion stage converts the emitted and incoming signals to a low-frequency signal that is digitized and processed in the microprocessor. However, the optical aperture arranged in the waveguide disadvantageously causes interference signals by reflection of the microwaves, the amplitudes of which are much greater than those of the useful signal. In practice the output signal of the frequency conversion stage owing to any mode changes of the microwave signal and/or multiple reflections of the optical aperture contains a power density fraction that can be much higher than the fraction of the useful signal reflected from the liquid surface. The spectral lines of the power density spectrum that occur at different filling heights yield relatively high values at low frequencies that are due to reflection of the optical aperture, but lower values at higher frequencies as a result of the longer measurement path. The high low-frequency power fractions that occur, especially when the optical aperture is contaminated, are also present at low liquid level. The deviations between the low-frequency and high-frequency power density values can lie between 4- and 20-fold in industrial tanks and the like or even higher.

DE-OS 3,134,243 discloses a circuit for a level measurement device without a cavity resonator aperture, in which a filter is arranged between a frequency conversion stage and an A/D converter, which is intended to filter out undesired frequencies. Since distance information is part of the mixed frequency, filtering out undesired frequencies would also filter out the corresponding useful signals and not permit distance determination in this frequency range at all.

SUMMARY OF THE INVENTION

In contrast, it is an object of the invention to provide such a circuit in a way that the interference signals are attenuated without influencing detection of the distance information.

This is achieved according to the invention in that a band-pass filter is provided between the frequency conversion stage and the A/D converter which has a lower base frequency and attenuates the low-frequency interference frequencies.

According to the invention, the band-pass filter attenuates only the low-frequency region of the frequency band. In this region lie the interference frequencies caused by the optical aperture and the useful frequencies, which form when there is a relatively high filling level and a high power density is used. In this fashion the low-frequency interference frequencies are virtually eliminated and the useful signals with a useful power density are transmitted for evaluation. On the other hand, useful signals with a frequency above the base frequency of the band-pass filter, which have only a limited power density because of the greater distance between the level measurement device and the surface of the medium, are transmitted unattenuated.

According to the invention, a band-pass filter with the appropriate limiting frequency is selected which includes the spectrum of the interference frequencies caused by the optical aperture. For practical purposes a suitable limiting frequency corresponds to a distance frequency generated when the distance between the coupler of the level measurement device and the liquid level is between about 0.1 to 3 m. The lower base frequency can advantageously be controlled either by a microprocessor or a computer, or the band-pass filter can be made so that several limiting frequencies can be selected. Frequency analysis can be carried out with the microprocessor, and the limiting frequency of the band-pass filter can be set in accordance with the percentage of interference frequencies. Selection of the limiting frequency as a function of fill level may also be chosen. Since the frequency shift is very limited at a high fill level, attenuation in this measurement range should be avoided as far as possible. The interference frequencies caused by the optical aperture are preferably determined when the tank is empty. They are then stored in the microprocessor and used during computerized signal processing.

To inhibit overcontrol of the A/D converter, a microprocessor-controlled amplifier can be associated with the band-pass filter, either before or after the band-pass filter, or integrated therewith.

DESCRIPTION OF PREFERRED EMBODIMENTS

Figure 1:
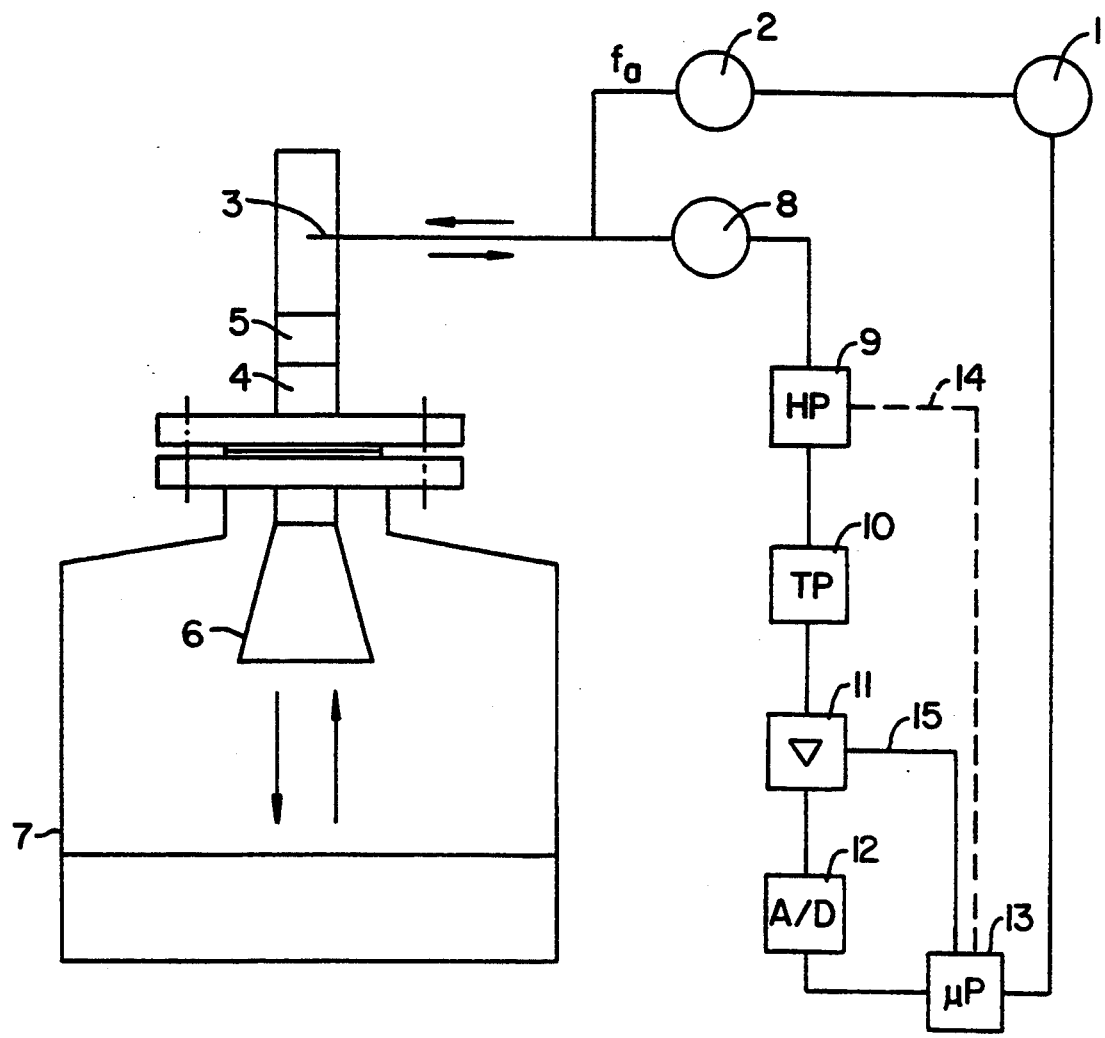
FIG. 1 is a circuit diagram for a level measurement device.
Figure 2:
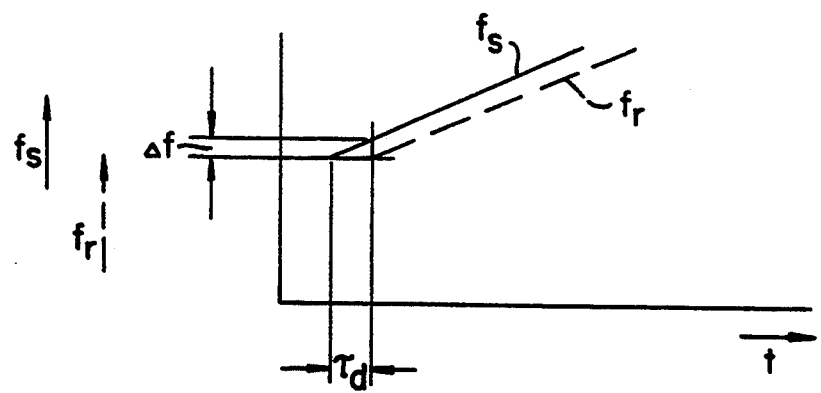
FIG. 2 diagrammatically shows the frequency shift between the transmitted and incoming signal.

As shown in FIG. 1, a voltage-controlled oscillator 2 which generates an electrical output $f_a$ of continuously changing frequency is controlled by means of a sawtooth generator 1 or the like. An example of a time plot of this frequency is shown in FIG. 2 by curve $f_s$. The emitted signal $f_s$ is converted by a coupler 3 into electromagnetic waves (microwaves) which are directed onto a liquid level in an industrial tank 7 or the like via a waveguide 4, an optical aperture 5 and an antenna 6. The microwaves reflected by the liquid surface are received by antenna 6 and converted by coupler 3 into an electrical signal $f_r$ that is fed to a mixer 8. The travel time of the microwave from coupler 3 to the liquid surface and back results in a level-dependent frequency shift $\Delta f$ relative to the emitted signal (cf. FIG. 2). This frequency shift is represented in equation (1).

$$\Delta f = \tau_d \frac{df_s}{dt} \quad (1)$$

in which, as a first approximation, the travel time of the electromagnetic waves ($\tau_d$) is:

$$\tau_d = \frac{2h}{c} \quad (2)$$

wherein
h=the distance between the coupler-liquid level and
c=speed of light.
From equations (1) and (2) one can get $$\Delta f = \frac{2h}{c} \cdot \frac{df_s}{dt} \quad (3)$$

The frequency shift is thus directly proportional to the liquid fill level.

Figure 3:
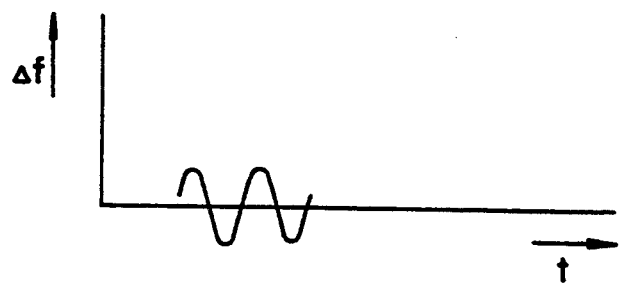
FIG. 3 shows the low-frequency signal formed by a frequency conversion stage.

The emitted signal $f_s$ and the incoming signal $f_r$ are fed to mixer 8, whose output signal contains the low-frequency distance signal $\Delta f$. It is depicted in FIG. 3 as an ideal sine curve. In reality the output signal contains additional frequency components as a result of reflections of the microwaves on the wall of the tank, structures in the tank, etc. Such interference frequencies can be detected and suppressed with a microprocessor that is appropriately programmed on the basis of a so-called learning curve. For this purpose the low-frequency output signal $\Delta f$ of mixer 8 is fed to an A/D converter 12 via a band-pass filter which includes a high-pass filter 9 and a low-pass filter 10 and is digitized with a discrete number of scans. From the series of digital values the microprocessor 13 performs a frequency analysis and determines a discrete power density spectrum.

Figure 4:
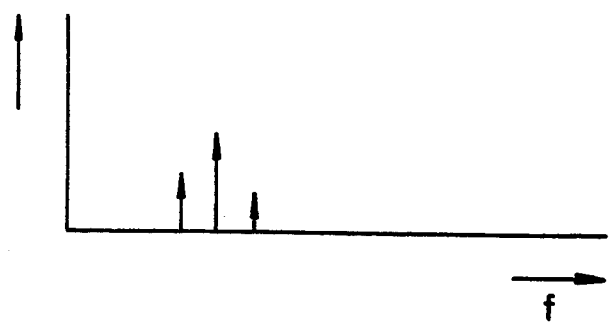
FIG. 4 shows the power density spectrum formed by an A/D converter.

If the output signal $\Delta f$ were purely sinusoidal, the power density spectrum would consist only of a few frequency lines, as shown in FIG. 4, in which the two secondary lines are caused by the limited time availability of signal $\Delta f$ for the frequency analysis.

In practice the output signal $\Delta f$ of the frequency conversion stage 8 contains a power density fraction that can be much higher than the fraction of useful signal reflected from the liquid level as a result of mode variations in the microwave signal and/or multiple reflections by the optical aperture. The spectral lines of the power density spectrum that occur at different fill levels give relatively high values at low frequencies, which are due to reflection by the optical aperture, but at higher frequencies yield lower values as a result of the longer measurement path. The high low-frequency power fractions that develop, especially when the optical aperture is contaminated, are also present at low fill levels. Differences between the low-frequency and high-frequency power density values can be as high as 4 to 20 and for industrial tanks, etc. even more.

The interference frequencies are first determined when the tank is empty. They are stored in microprocessor 13 and used during computerized signal processing. To attenuate the low-frequency interference, the band-pass filter has a lower frequency limit. The limiting frequencies of the high-pass filter 9 and low-pass filter 10 are suitably chosen in such a way that at maximum fill level the relatively small output signal $\Delta f$ is transmitted almost without attenuation, whereas the lowest limiting frequency of high-pass filter 9 is determined on the basis of the frequency shift that takes place in the empty tank. The minimal scan frequency for the A/D converter 12 is determined on the basis of the Shannon relation. In practice a limiting frequency can be chosen so that the low-frequency shift $\Delta f$ corresponds to a fill level at which the distance between it and the antenna is about 0.1 to 3.0 m.

For use under differing operating conditions, the high-pass filter 9 permits selection of several limiting frequencies. Preferably, however, the high-pass filter 9 is made so that it can be controlled by microprocessor 13. In this fashion, changes in operating conditions; e.g., contamination, etc., and interference resulting therefrom can be suppressed. Microprocessor 13 calculates such changes from the power density and adjusts the limiting frequency of the high-pass filter 9 accordingly. The pertinent control line is denoted 14 in FIG. 1.

The A/D converter should be protected against overcontrol caused by the largest low-frequency signals, which leads to poor resolution. Instead of a costly high-resolution A/D converter, an amplifier stage 11 is provided before or after the band-pass filter. It prevents overcontrol of the A/D converter 12 and is controlled by microprocessor 13 via line 15.

At an essentially constant fill level it can be advantageous to choose a higher limiting frequency for the band-pass filter. This can also be done by making the limiting frequency adjustable or computer controlling it.

As shown in FIG. 4, the power density spectrum does not have a discrete spectral line, but generally contains adjacent lines. Since one line corresponds to a discrete distance, the attendant lines can be taken into account when calculating the fill level, for example, by weighting the amplitudes of the attendant lines. A linear weighting would be suitable in the flat region of the frequency characteristic. If the frequency lines are a nonconstant region of the filter, the roll-off is taken into account as a factor during weighting. The frequency output for a measured distance can be corrected for very accurate measurements during the interpolation of the discrete spectral lines.

What is claimed is:

1. An apparatus for measuring the height of a liquid in a tank comprising:
   means for generating a reference signal of continuously changing frequency;
   a coupler operatively coupled to the generating means for converting the reference signal into electromagnetic waves;
   an antenna connected to the coupler and the tank for directing the electromagnetic waves into the tank against the liquid and receiving a signal reflected by the liquid;
   a mixer operatively coupled to the generating means and the antenna, the mixer receiving the reference signal from the generating means and the reflected signal from the antenna, the mixer comparing the reference and reflected signals and computing a frequency shift signal which is a function of a distance travelled by the electromagnetic waves between the antenna and the liquid;
   a band-pass filter operatively coupled to the mixer for attenuating frequencies below a lower limiting frequency so to attenuate interference signals corresponding to said frequencies; and
   a microprocessor coupled to the filter for calculating the height of the liquid based on the frequency shift signal, the microprocessor continually adjusting the lower limiting frequency of the filter so that the frequencies corresponding to the interference signals are sufficiently attenuated while attenuation of the frequency shift signal is minimized.

2. Apparatus according to claim 1 wherein the lower limiting frequency corresponds to a distance between the antenna and the liquid of about 0.1 to 3 m.

3. Apparatus according to claim 1 wherein the band-pass filter includes means for selecting several lower limiting frequencies.

4. Apparatus according to claim 1 further including an amplifier coupled to the band-pass filter and an A/D converter coupled to the amplifier for receiving the frequency shift signal and converting said signal to digital values, the A/D converter having an optimal range for sufficient resolution of the frequency shift signal, the microprocessor controlling the amplifier so that the frequency shift signal is amplified into the optimal range of the A/D converter.

5. The apparatus according to claim 4 wherein the microprocessor analyzes the digital values and determines a power density spectrum having adjacent lines, each line corresponding to a discrete distance travelled by an electromagnetic wave in the tank, the microprocessor weighting the amplitudes of each line to determine the height of the liquid.

6. The apparatus according to claim 1 wherein the generating means includes a sawtooth generator and an oscillator.

7. The device of claim 1 wherein the band-pass filter includes a high-pass filter and a low-pass filter, the high-pass filter attenuating frequencies below the lower limiting frequency to prevent low-frequency interference with the frequency shift signal and the low-pass filter attenuating frequencies above the higher limiting frequency to prevent high-frequency interference with the frequency shift signal.

8. The apparatus of claim 1 wherein the microprocessor controls the lower limiting frequency by determining the interference frequencies when the tank is empty, the interference frequencies being stored in the microprocessor so that the microprocessor can make continual adjustments to the lower limiting frequency based on a percentage of the interference frequencies that are transmitted with the frequency shift signal.

9. A method for measuring the height of a liquid in a tank comprising the steps of:
   generating a reference signal of continuously changing frequency;
   converting the reference signal into electromagnetic waves;
   directing the electromagnetic waves into the tank against the liquid and receiving a signal reflected by the liquid;
   comparing the reference signal with the reflected signal to compute a frequency shift signal corresponding to a distance travelled by the reflected signal in the tank;
   filtering the frequency shift signal with a band-pass filter that attenuates frequencies below a lower limiting frequency and above a higher limiting frequency so to attenuate interference signals corresponding to said frequencies;
   controlling the lower limiting frequency with a microprocessor so that the frequencies corresponding to the interference signals are sufficiently attenuated while attenuation of the frequency shift signal is minimized; and
   calculating the height of the liquid in the tank based on the frequency shift signal.

10. The method of claim 9 wherein the controlling step comprises determining the frequencies corresponding to the interference signals by directing the electromagnetic waves into the tank when the tank is empty, the microprocessor storing said frequencies and then continually adjusting the lower limiting frequency based on a percentage of said frequencies received by the microprocessor when the liquid is in the tank.

11. The method of claim 9 wherein the calculating step is carried out by scanning the frequency shift signal and converting said signal into digital values with an A/D converter and analyzing the digital values and determining a discrete power density spectrum with the microprocessor.

12. The method of claim 11 further including the step of controlling the band-pass filter so that the lower and higher limiting frequencies can be changed based on changes in the power density spectrum.

13. The method of claim 9 further including the step of controlling the higher limiting frequency with the microprocessor by directing electromagnetic waves in the tank when the tank is empty, the microprocessor determining the frequency of a bottom wave that strikes a bottom of the tank, the microprocessor then computing an upper limit for the higher limiting frequency based on the bottom wave.

14. The method of claim 9 further including the step of determining the lower limiting frequency based on an approximate height of the liquid in the tank, the tank having a maximum fill line and a minimum fill line, the microprocessor setting the lower limiting frequency to a lower value when the liquid is closer to the maximum fill line and to a higher value when the liquid is closer to the minimum fill line.

* * * * *